United States Patent
Mija et al.

(10) Patent No.: US 10,752,747 B2
(45) Date of Patent: Aug. 25, 2020

(54) HUMINS-CONTAINING FOAM

(71) Applicant: Synvina C.V., Amsterdam (NL)

(72) Inventors: Alice Cristina Mija, Nice (FR); Edserd De Jong, Amsterdam (NL); Jan Cornelis Van Der Waal, Amsterdam (NL); Gerardus Petrus Maria Van Klink, Amsterdam (NL)

(73) Assignee: Furanix Technologies B.V., Amsterdam (NL)

( * ) Notice: Subject to any disclaimer, the term of this patent is extended or adjusted under 35 U.S.C. 154(b) by 216 days.

(21) Appl. No.: 15/769,403

(22) PCT Filed: Oct. 26, 2016

(86) PCT No.: PCT/NL2016/050742
§ 371 (c)(1),
(2) Date: Apr. 19, 2018

(87) PCT Pub. No.: WO2017/074183
PCT Pub. Date: May 4, 2017

(65) Prior Publication Data
US 2018/0305511 A1 Oct. 25, 2018

(30) Foreign Application Priority Data
Oct. 26, 2015 (NL) .................................... 2015657

(51) Int. Cl.
*C08J 9/14* (2006.01)
*C08J 9/28* (2006.01)
(Continued)

(52) U.S. Cl.
CPC .............. *C08J 9/142* (2013.01); *C08J 9/28* (2013.01); *C08K 5/0008* (2013.01);
(Continued)

(58) Field of Classification Search
CPC ........................................................ C08J 9/00
See application file for complete search history.

(56) References Cited

U.S. PATENT DOCUMENTS 3,293,200 A 12/1966 MacGregor
4,532,260 A * 7/1985 MacKeighen ............ C08J 9/06
521/151

(Continued)

FOREIGN PATENT DOCUMENTS

DE 3621517 A1 1/1988
EP 0338151 A1 10/1989
(Continued)

OTHER PUBLICATIONS

Vijayan et al. Journal of the European Ceramic Society 34 (2014) 425-433. (Year: 2014).*

(Continued)

*Primary Examiner* — Michael M Dollinger
(74) *Attorney, Agent, or Firm* — Hoffmann & Baron, LLP

(57) ABSTRACT

A foam includes a cellular structure and having a density of at most 0.50 g/cm$^3$, where the cellular structure is provided by a solid material that includes humins. Such a foam is prepared in a process, which includes: providing a starting material containing humins; and heating the starting material to a temperature in the range of 150 to 450° C. The foam can be used in articles for a variety of applications such as substrate for plant growth, as adsorbent for treating waste water or waste gases, as support for solid catalysts, as insulation material, or packaging material.

21 Claims, 1 Drawing Sheet

(a) 220°C   (b) 230°C   (c) 400°C

(51) Int. Cl.
*C08K 5/00* (2006.01)
*C08L 99/00* (2006.01)
*C08K 11/00* (2006.01)
*C08L 5/00* (2006.01)
*C08J 9/00* (2006.01)
*C08J 5/04* (2006.01)

(52) U.S. Cl.
CPC .............. *C08K 11/005* (2013.01); *C08L 5/00* (2013.01); *C08L 99/00* (2013.01); *C08J 5/042* (2013.01); *C08J 5/043* (2013.01); *C08J 5/044* (2013.01); *C08J 5/047* (2013.01); *C08J 9/0085* (2013.01); *C08J 2201/05* (2013.01); *C08J 2203/12* (2013.01); *C08J 2205/04* (2013.01); *C08J 2205/044* (2013.01); *C08J 2367/00* (2013.01); *C08J 2377/00* (2013.01); *C08J 2399/00* (2013.01); *C08J 2425/02* (2013.01); *C08J 2427/06* (2013.01)

(56) References Cited

U.S. PATENT DOCUMENTS

| | | | | |
|---|---|---|---|---|
| 4,600,728 | A | 7/1986 | MacKeighen et al. | |
| 6,099,990 | A * | 8/2000 | Denton, III | H01M 4/583 423/447.5 |
| 6,558,712 | B1 * | 5/2003 | Ghosal | A61K 36/00 424/195.18 |
| 9,073,841 | B2 * | 7/2015 | Mullen | C07C 51/00 |
| 9,598,529 | B2 * | 3/2017 | Langlois | C08G 18/6492 |
| 9,737,560 | B1 * | 8/2017 | Shulgin | B65D 25/205 |
| 2014/0171535 | A1 * | 6/2014 | Narayan | C07C 277/08 521/164 |
| 2016/0002358 | A1 * | 1/2016 | Teixeira | B09B 5/00 435/165 |

FOREIGN PATENT DOCUMENTS

| | | |
|---|---|---|
| RU | 2209230 C2 * | 7/2003 |
| WO | 2007/104514 A2 | 9/2007 |
| WO | 2007/104515 A1 | 9/2007 |
| WO | 2015/088341 A1 | 6/2015 |

OTHER PUBLICATIONS

Narasimman et al. Carbon 50 (2012) 1999-2009. (Year: 2012).*
Wilson et al. Carbon 118 (2017) 545-555. (Year: 2017).*
"Process for the modification of humins", Netherlands patent application No. 2017547, filed Sep. 29, 2016 in the name of Avantium Knowledge Center B.V., 24 pages.
Robert-Jan van Putten et al., "Hydroxymethylfurfural, a Versatile Platform Chemical Made from Renewable Resources", Chem. Rev. 2013, 113, 1499-1597.
Ilona van Zandvoort et al., "Formation, Molecular Structure, and Morphology of Humins in Biomass Conversion: Influence of Feedstock and Processing Conditions", ChemSusChem 2013 6, 1745-1758.

* cited by examiner

US 10,752,747 B2

HUMINS-CONTAINING FOAM

CROSS-REFERENCE TO RELATED APPLICATIONS

This application is the National Stage of International Application No. PCT/NL2016/050742, filed Oct. 26, 2016, which claims the benefit of Netherlands Application No. NL 2015657, filed Oct. 26, 2015, the contents of which is incorporated by reference herein.

FIELD OF THE INVENTION

The present invention relates to a foam comprising a cellular structure and which foam comprises humins.

BACKGROUND OF THE INVENTION

Humins constitute a known material. U.S. Pat. No. 3,293,200 describes thermosetting adhesive compositions that are useful in the manufacture of plywood and contain, as essential ingredients, a water-soluble phenol-aldehyde resin and a water-insoluble, finely-divided humins material obtained from the manufacture of levulinic acid by acid hydrolysis of lignocellulose, i.e. a combination of carbohydrates and lignin. Although various procedures are known for the manufacture of levulinic acid from lignocellulose, the reaction generally is carried out under severe acid hydrolysis conditions at a temperature in excess of 150° C., usually between 170° C. and 210° C. in the presence of a strong acid catalyst. During the reaction, the humins material is formed as a result of an acid breakdown of lignocellulose while substantially the entire carbohydrate portion of the lignocellulose is degraded and the hexosans converted to the desired levulinic acid.

Humins have been obtained in the dehydration of carbohydrates in the manufacture of levulinic acid, 5-hydroxymethylfurfural and/or 5-alkoxymethylfurfural and/or acyloxymethyl-furfural. An example of such a dehydration reaction is described in DE 3621517. Other examples of such a process are described in WO 2007/104514 describing the preparation of alkoxymethylfurfural, and WO 2007/104515, disclosing the preparation of acyloxymethyl-furfural. Although the latter processes have set out to reduce the yield of humins, the processes unavoidably yield amounts of humins for which a useful outlet is sought.

An application of humins has been described in DE 3612517, where it is stated that the humins, i.e. the by-product of the preparation of alkoxymethylfurfural and alkyl levulinates from cellulose, lignocellulose or starch with an alcohol, can only be used for the provision of heat by combusting it. In a journal article by Robert-Jan van Putten et al., Chem. Rev., 2013, 113(3), 1499-1597, the formation of humins from the dehydration of carbohydrates is discussed. The article mentions the forming of humins as unwanted by-product in addition to the formation of the desired products hydroxymethyl furfural, furfural and levulinic acid. It is mentioned that the most likely applications for humins are either as a fuel, particularly for generating heat for the various operations to accomplish the carbohydrate dehydration, or as compost.

It would therefore be very advantageous, if humins can be used in a more economic and value-added application. In WO2015088341 a composition is disclosed wherein furfuryl alcohol and humins are used as wood adhesive and impregnating agent for wood and other materials.

SUMMARY OF THE INVENTION

It has now surprisingly been found that humins can be converted into foam, which opens a myriad of potential valuable applications for humins. Accordingly, the present invention provides a foam, comprising a cellular structure and having a density of at most 0.50 g/cm$^3$, wherein the cellular structure is provided by a solid material that comprises humins.

In this specification humins are the colored bodies which are believed to be polymers containing moieties from hydroxymethylfurfural, furfural, carbohydrate and levulinic acid. These colored bodies are i.a. produced as by-products in the partial degrading of carbohydrates by heat or other processing conditions, as described in e.g. EP 338151. Humins are believed to be macromolecules containing furfural and hydroxymethylfurfural moieties. Further moieties that may be included in humins are carbohydrate, levulinate and alkoxymethylfurfural groups. A mechanism for the formation of humins molecules may be a polycondensation pathway, leading to a network of furan rings linked by ether and acetal bonds. A structure for humins is presented in I. van Zandvoort et al. ChemSusChem, 2013, 6, 1745-1758. In this journal article the humins structure is characterized by furan rings connected via alkylene moieties. Thus, typical for humins are furan rings and alkylene groups, such as methylene and ethylene groups, whereas other constituent groups may be hydroxyl, aldehyde, ketone, carboxylic acid and ester groups. When the dehydration of the carbohydrates into furan derivatives is carried out in the presence of an organic solvent other functional groups such as alkoxy and ester groups may be present.

Humins may also be characterized with reference to the Van Krevelen diagram. In such a diagram the hydrogen index, i.e. the atomic hydrogen:carbon ratio, and the oxygen index, i.e. the atomic oxygen:carbon ratio, are plotted against each other. It was found that humins suitably have an oxygen:carbon atomic ratio in the range of 0.30 to 0.70, preferably from 0.40 to 0.60 and a hydrogen:carbon atomic ratio in the range of 0.60 to 1.60, preferably from 0.80 to 1.40. It is observed that during the formation of the foam alterations in the humins may occur which may have an influence on the indices according to the Van Krevelen diagram. The indices may move to a more carbon-rich composition in the foam.

The humins that may be used in the present invention are preferably derived from the dehydration of carbohydrates, such as cellulose, starch, sugars such as glucose, fructose and combinations thereof. Such dehydration processes are typically used for the conversion of carbohydrates to levulinic acid or esters thereof, or 5-hydroxymethylfurfural or ethers thereof. Such processes have i.a. been described in the above-mentioned patent documents DE 3621517, WO 2007/104514 and WO 2007/104515. It has been found that heating the humins, prepared in such dehydration processes, yields foams with the characteristics of the present invention.

The humins that may be used in the present invention may also have been modified as described in pending patent application NL2017547. In accordance with this application the modified humins are suitably prepared in a process for the modification of humins comprising:

contacting humins with a reactive compound selected from the group consisting of a carboxylic acid, an acyl halide, a carboxylic anhydride, an olefin, an epoxy-group containing compound and combinations thereof in the presence of an organic solvent to obtain a humins-containing admixture;

maintaining the humins-containing admixture at elevated temperature to achieve a reaction between the humins and the reactive compound, thereby obtaining modified humins; and recovering the modified humins.

The modified humins suitably comprise furyl groups, and further comprise acyl moieties derived from a reactive compound selected from the group consisting of a carboxylic acid, an acyl halide and a carboxylic anhydride. The acyl moiety is preferably an acetyl group. Advantageously this is obtained from a process for the modification of humins as described above with acetic anhydride as reactive compound.

DETAILED DESCRIPTION OF THE INVENTION

Figure 1:
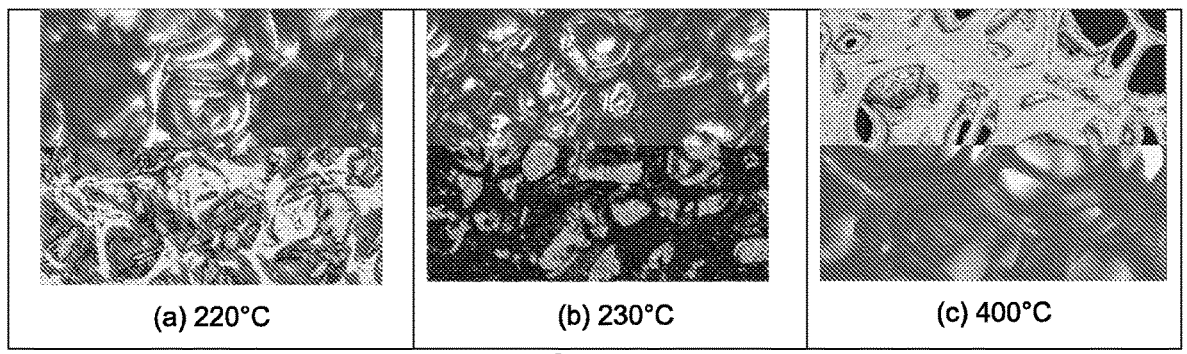
FIG. 1 shows three pictures of humins-containing foams according to the invention that have been obtained at different temperatures.

The density of humins may vary. Typically, the density of humins is in the range of 0.80 to 1.45 g/ml. The density of the foam is determined in accordance with ASTM D1622. The foam according to the present invention has a density of at most 0.50 g/cm$^3$. It is suitable to prepare foams with a density in the range of 0.025 to 0.50 g/cm$^3$, preferably in the range of 0.04 to 0.20 g/cm$^3$.

The reduced density is due to the occurrence of a cellular structure of the humins foam. The cellular structure may be an open-cell structure, a closed-cell structure and combinations thereof. The cell sizes in the foam may vary within wide ranges. Typically in a closed-cell structure the cellular structure suitably comprises cells with an average cell size in the range of 1 to 1,000 μm. By cell size is understood the average cell diameter, assuming a spherical shape of each cell. The cell size is determined in accordance with ASTM D3576. For small cell sizes, the measurement may be taken from an enlarged photograph obtained by scanning electron microscopy instead of measurement taken directly from the foam.

The cell sizes can be such that the foam is a macroporous, mesoporous or microporous foam. For a macroporous foam the cells may have cell sizes in the range of several hundreds to several thousands of micrometers, e.g. from 0.5 to 10.0 mm. In such situations the foams tend to have an open cell structure. Such an open cell structure is beneficial for certain applications. In mesoporous foams, i.e. foams having an average cell size in the range of 100 to 5,000 μm, the cellular structure may comprise open cells and/or closed cells. The humins-containing foams can also be shaped such that they have micropores. The cell size in such foams may be in the range of 1 nm to 20 μm. The cellular structure in such foams typically comprises closed cells. The closed cells may be advantageous for certain applications, e.g. for insulation purposes. Preferably, the average cell diameter is in the range of 1 to 5,000 μm.

The foams according to the present invention have the surprising feature that they show a remarkably high adsorption behavior, despite a relatively low specific surface area. The foams according to the present invention typically have a specific surface area, as determined according to the BET method, of 1 to 50 m$^2$/g. This range is from about 10 to 50 times lower than what can be obtained with activated carbon. Since the humins-containing foam has an excellent adsorption behavior it can suitably be used as catalyst carrier, wherein a variety of metals may firmly be adsorbed to the humins-containing foam, which acts as catalyst support. Not only the loading of catalytically active metals can be accomplished in this way, but also the absorption of detrimental metals can be adsorbed onto the foam in the treatment of metals-containing waste streams, such as waste water.

Above it has been indicated that the humins may be characterized by the relative ratios of carbon, oxygen and hydrogen as expressed in the Van Krevelen diagram. It is evident that humins may also contain other elements, different from carbon, oxygen and hydrogen. Such elements include trace elements such as sodium, sulfur, chlorine, calcium, potassium, iron, zinc, copper, molybdenum, boron, manganese and magnesium. Such elements may end up in the ash when the humins are combusted. Such elements may be present from natural sources, e.g. as trace elements for facilitating the growth of the plants from which the humins are derived. Some of the elements may also be introduced in the chemical process wherein the humins are produced as by-product. The main elements, though, are carbon, oxygen and hydrogen.

The foam according to the present invention tends to be rigid. However, it may show a mechanical strength that is undesirable for some applications. In such cases the foam may be considered too brittle. In order to overcome this undesired property, the foam may be reinforced by the incorporation of another material, in particular by adding fibrous material. Accordingly, the solid material that provides the cellular structure preferably comprises at least one additional material in addition to humins. The additional material is preferably a fibrous material or a polymeric material or a material that is both fibrous and polymeric. The fibrous material can be selected from organic and inorganic fibrous material. Examples of suitable bio-based fibers are, hemp fiber, flax fiber, sisal fiber, viscose. Suitable fibrous material may be selected from glass fibers, graphite fibers, also known as carbon fibers, aluminium fibers, organic fibers and combinations thereof. An example of a suitable polymeric material that is also bio-based is starch. Examples of suitable organic non-biobased polymeric fibers include polyamide fibers, polyolefin fibers, polyvinyl chloride fibers, polyester fibers and combinations thereof. The polyamide can be selected from aliphatic, cycloaliphatic and aromatic polyamides. Hence, it is feasible to use nylon-6, or nylon-6,6, fibers. Alternatively, fibers of the aromatic polyamide or aramide such as poly-p-phenylene terephthalamide, marketed under the trademarks Kevlar and Twaron, may be used. Examples of suitable polyolefins include polyethylene and polypropylene. In particular ultra-high molecular weight polyethylene, marketed under the trademark Dyneema, is very suitable. As polyesters, polyethylene terepthalate, polytrimethylene terephthalate, polybutylene terephthalate, polyethylene naphthenate, polybutylene naphthenate, polyethylene furan dicarboxylate, polybutylene furandicarboxylate and combinations thereof may be used for the preparation of fibers.

The amount of the additional material, such as fibers, in the solid material that composes the cellular structure can vary within wide ranges. It is desirable that fibers are embedded in the humins. Therefore, it is advantageous that the weight ratio between humins and fibrous material is in the range of 0.1:1 to 10:1.

For certain applications it is advantageous to include other biomass material in the foam according to the invention. This may be the case when the foam is used as substrate for growing plants, vegetables or flowers. In such cases the humins may be combined with other biomass that not only provide nutrients for the plants, vegetables and flowers, but also provide improved strength to the foam. Good results have been obtained by incorporating hemp, nettle, starch, straw, hay and spent mushroom substrate into the solid material that provides the cellular structure, in addition to humins. These materials may be added to humins in the same ratios as fibrous material mentioned above.

The foam according to the present invention can be prepared in a simple way. The process for preparing a foam according to the invention comprises providing a starting material containing humins and heating the starting material to a temperature in the range of 150 to 450° C. The mechanism for the foam forming is not quite understood. Without wishing to be bound by any theory it is believed that volatile components that are present in the humins-containing starting material evaporate whilst the humins are being heated. Further, volatile components may be formed from the humins polymers during the heating step. The softened humins polymers may then be pushed into a cellular structure by the evaporating volatile components. Above 450° C. carbonization and/or oxidation may take place, thereby rendering the foam obtained rather brittle. At certain humins such carbonization and/or oxidation may already start taking place at 350° C. Thus, the starting material is preferably heated to a temperature in the range of 160 to 425° C., more preferably from 170 to 410° C., and most preferably from 180 to 350° C. When the temperature reaches above 450° C., and at some humins even at temperatures above 350° C., the carbonization of the bio-based molecules in the starting material gets serious, so that such a temperature and higher are not very suitable.

The starting material comprises humins. When it is derived from the dehydration of a carbohydrate, the humins fraction obtained in such a dehydration process may include certain amounts of the chemicals that may be involved in such a dehydration process. Such chemicals may include monosaccharides which may be intermediate products or even feedstock compounds for the dehydration. Such monosaccharides may e.g. be glucose, fructose, or glycosides. The chemicals may also include end products such as 5-hydroxymethyl furfural, ethers or esters thereof, levulinic acid or esters thereof. Other chemicals are also feasible. The amounts in which these chemicals are present may vary significantly. Factors that may influence such amounts include the reaction conditions of the dehydration reaction and also the separation methods that are employed to separate the liquid end products from the viscous or even solid humins fraction. Suitably before foaming the starting material contains from 45 to 100% wt of humins, preferably from 50 to 95% wt, based on the humins-containing starting material.

When additional materials are added to the humins-containing starting material, such as described above, e.g. fibrous material, polymeric material or material that is both fibrous and polymeric, it may be added to the starting material in a weight ratio of e.g. 0.1 to 10 parts by weight (pbw) per pbw of starting material.

It is suitable to heat the starting material to a temperature in the range of 170 to 220° C. In order to allow the volatile components to form the foam the pressure is preferably not too high to inhibit sufficient evaporation. Therefore, the pressure is suitably at most 1.5 bar. Subatmospheric pressures may be used, e.g. pressures of 0.01 to 1.0 bar. The advantage of such low pressures is that the evaporation of any volatile component is facilitated. However, these pressures also add to the costs and complexity of the process. Therefore, it is generally preferred to heat the starting material at a pressure in the range of 0.9 to 1.1 bar, typically at atmospheric pressure.

The atmosphere in which the heating takes place is not critical. The heating may take place in an inert atmosphere. That would mean that the atmosphere does not contain any oxygen. Such inert atmosphere may e.g. comprise nitrogen, helium, neon, argon, carbon dioxide and combinations thereof. However, the application of such an atmosphere adds to the complexity of the process whilst the use thereof does not entail any major advantage. It has been found that when the heating of the humins-containing starting material is carried out in an oxygen-containing atmosphere, such as air, no significant oxidation of the organic humins takes place. Therefore, the heating of the starting material preferably takes place in an oxygen-containing gas. Suitable oxygen-containing gas includes air or oxygen-depleted air, such as combustion off-gas. It may be advantageous to apply a flow of gas during the heating step. By the flow of gas, e.g. an air flow, any volatile compound is removed from the heated humins.

The formation of a foam can be accomplished in a prolonged period. It has been found that good foams can be prepared when the starting material is heated at the desired temperature for a period of 0.01 to 5 hrs, preferably from 0.1 to 2.5 hrs.

It is known that foams from synthetic polymers, such as polystyrene, can be prepared by mixing the molten polymer with a blowing agent under pressure and extruding the mixture through a die to an area of lower pressure. It is mentioned that a similar procedure can be applied, too, to the formation of a foam according to the present invention.

The humins-containing starting material can originate from a variety of sources. Humins can be found in moors and in peat. However, preferably, the starting material comprises humins that have been obtained in the dehydration of carbohydrates, in particular in the dehydration of carbohydrates in the manufacture of levulinic acid, 5-hydroxymethylfurfural (HMF) and ethers or esters of HMF. The humins thus produced typically comprise volatile components, such as acetic acid, formic acid, and various other carbonyl and/or hydroxyl group-containing compounds. The presence thereof facilitates the foam formation. Therefore, the production of foam from these humins generally does not require the addition of an additional blowing agent. The carbohydrates that form the feedstock for the dehydration reaction is suitably selected from cellulosic or lignocellulosic material. Thus, it is feasible to use wood, plants, paper or waste paper, but also sugars such as fructose, glucose, sucrose, and other mono-, di- and oligosaccharides.

In certain cases it may be advantageous to mix the starting material containing humins with a blowing agent before it is being heated. Such may be beneficial when the humins-containing compositions that are to be used for foam production contain no, or only a small content of, volatile components. It may be then be advantageous to mix the starting material with a blowing agent, to heat the mixture of the starting material and the blowing agent to a temperature in the range of 150 to 450° C. under pressure and to extrude the heated mixture into an area with a pressure lower than the pressure prevailing at the heating of the mixture, thereby expanding the blowing agent and obtaining a foam.

The blowing agent can be selected from a range of compounds that are known as blowing agents for other polymeric foams. Such blowing agents include water, carbon dioxide, nitrogen, hydrogen, but also gas-forming compounds such as azo compounds, that release nitrogen, and borohydride compounds that release hydrogen, or citric acid or bicarbonate compounds that release carbon dioxide. It is also feasible to use chlorofluorocarbons or freons. However, since freons are environmentally hazardous, their use is not preferred. Also vaporous or gaseous hydrocarbons, such a methane or natural gas, or $C_2$-$C_6$ alkanes or $C_4$-$C_6$ cycloalkanes can be used as blowing agent. It is evident that such blowing agents may be admixed with the humins-containing starting material in order to facilitate the foam formation.

Alternatively, other compounds may be admixed with the humins-containing starting material. Such other compounds may be those compounds that are vaporous at the temperature to which the starting material is heated. In particular the compounds that can be present in the starting material are very suitable for admixing with the starting material. The blowing agent is therefore, preferably, selected from the group consisting of water, 5-hydroxymethyl furfural (HMF), $C_1$-$C_4$ alkyl ethers of HMF, $C_1$-$C_4$-alkyl esters of HMF, levulinic acid, $C_1$-$C_4$-alkyl esters of levulinic acid and combinations thereof.

The blowing agents can be admixed with the starting material in amounts as can easily be considered by the skilled person. When an additional blowing agent is added to the starting material the amount thereof is typically in the range of 0.1 to 10 parts by weight of blowing agent per part by weight of starting material.

As stated above, the foam produced in accordance with the invention may be relatively brittle. It has been found that the mechanical strength is increased when the humins-containing starting material contains residues of another monomer that reacts with the humins polymer and that is also capable of forming a network of polymeric chains. Therefore, the starting material is preferably mixed with a monomer containing at least one reactive group towards a hydroxyl, carbonyl or carboxyl group. The reactive groups are suitably selected from the groups consisting of an epoxy group, an isocyanate group, an amine group, a hydroxyl group, a carboxyl group and combinations of one or more of such groups. Suitably the monomer contains two or more of such reactive groups, e.g. two to four. The use of such monomers has the advantage that the monomers can react with different polymer chains so that a stronger network is obtained. Examples of suitable monomers include epoxidized vegetable oils, such as epoxidized linseed oil (ELO) or epoxidized sunflower oil (ESO), bisphenol A diglycidyl ether, aliphatic or aromatic diisocyanate, such as methane diisocyanate and toluene diisocyanate, 1,6-diaminohexane, adipic acid and other diacids such as furan dicarboxylic acid and terephthalic acid, diols, such as ethylene glycol, trimethylene, tetramethylene and hexamethylene glycol and combinations thereof. The monomer containing the reactive group may be present in a variety of amounts. When the humins comprise a large number of hydroxyl, carboxyl and carbonyl groups, e.g. when the starting material comprises the by-product of the dehydration of carbohydrates, the humins polymer chains may react with each other in view of the large number of reactive hydroxyl and carbonyl and carboxyl groups that are present in the polymer chains. The amount of monomer with the reactive group may then be relatively small, e.g. in the range of 0.1 to 0.5% wt, based on the starting material. When the starting material contains humins that have been obtained from the moors the humins polymers tend to have a relatively small number of reactive groups themselves. It may be helpful to add a larger amount of monomer with at least one reactive group to the starting material, e.g. from 0.5 to 5% wt, based on the starting material. Therefore, the amount of the monomer containing at least one reactive group is preferably mixed with the starting material in an amount of 0.1 to 5% wt, based on the starting material.

The foam according to the present invention can be used in a wide variety of applications. In a first application, it can be used as substrate for plant growth. The cellular structure provides for a suitable substrate wherein the roots of plants can get a firm grip. At the same time the humins in the solid material that provides the cellular structure have an excellent adsorption capacity whereby it can ensure that sufficient water and nutrients are available for the plant.

If desired, the foam can contain fibers to increase its strength. These foams can be used in applications for similar foams, such as packaging material. Moreover, it may contain a biomass material that can be used as fertilizer for the plant. As indicated above the foam preferably contains spent mushroom substrate. Alternatively, other biomass material such as starch, hemp, nettles, hay, straw, manure, chicken feathers, chitinous materials, such as the cell walls of fungi, the exoskeletons of arthropods such as crustaceans (e.g., crabs, lobsters and shrimps) and insects, the radulae of molluscs, and the beaks and internal shells of cephalopods, and combinations thereof, may also be added to infer some additional strength and nutrients to the foam.

When such additional material is used in the starting material to produce the foams of the present invention the foaming conditions may be slightly modified. When the starting material contained 10% wt of hemp fibers in an experiment, the combination of humins and hemp fibers was heated to 225° C. for about one hour at a heating rate of 5° C./min. The result was an excellently light and fluffy foam.

Foam with a low density was also obtained in an experiment wherein the starting material contained 10% wt of spent mushroom substrate. The combined materials were heated for 1 hr at 100° C., and subsequently the temperature was raised to 200° C. at a heating rate of 2.5° C./min. The mixture was maintained at 200° C. for another hour, resulting in the foam with good strength and low density.

In view of the excellent adsorption capacity, the foam according to the present invention can also be used as adsorbent for the treatment of gases or liquids, in particular for the treatment of waste water streams or off gases, e.g. combustion off-gases or industrial waste gases.

The foam has a certain specific surface and a great adsorption capacity. Therefore it can suitably be used as catalyst support. Due to the good adsorption behavior catalytically active metals are firmly attached to the humins-containing solid material. Due to the open cell structure, the surface area is well accessible for any reactant that needs contact with the catalytically active metal.

Since the foam according to the present invention can also be executed as a closed cell structure and the foam has a low density, the foam is well suited for use as insulation material.

The invention is illustrated by means of the following examples.

Example 1

A humins fraction obtained from the dehydration of fructose in methanol, generally in accordance with the procedure described in WO 2007/104514, was used. The humins organic fraction was analyzed and was found to have the following composition:
- polymeric material: 73.0% wt
- monosaccharides: 11.3% wt
- 5-hydoxymethylfurfural: 7.7% wt
- 5-methoxymethylfurfural: 5.6% wt
- levulinic acid: 2.3% wt
- methyl levulinate: 0.1% wt The humins fraction had a density of about 1.2 g/cm$^3$.

Separate portion of the humins fraction were heated to 220° C., 230° C., and 400° C., respectively in an oven, whilst flow of air was applied through the oven. The heating rate in the oven was 5° C./min. When the desired temperature was reached, the humins fraction was maintained at the temperature for one hour in the case of the heating to 220 and 230° C., and then cooled to room temperature again. In the case of heating to 400° C., the humins fraction was kept at that temperature for 5 minutes, and then cooled to room temperature.

FIG. 1(a) shows the foam obtained at 220° C. FIG. 1(b) shows the foam obtained at 230° C., and FIG. 1(c) shows the foam obtained at 400° C. The foams show a nice cellular structure, wherein it is apparent that the foams in FIGS. 1(a) and 1(b) show closed cells. The foam in FIG. 1(c) shows an open cell structure. The densities of the foams shown in FIGS. 1(a) and (b) were about 0.25 g/cm$^3$; that of the foam in FIG. 1(c) was lower than 0.25 g/cm$^3$.

Example 2

Figure 2:
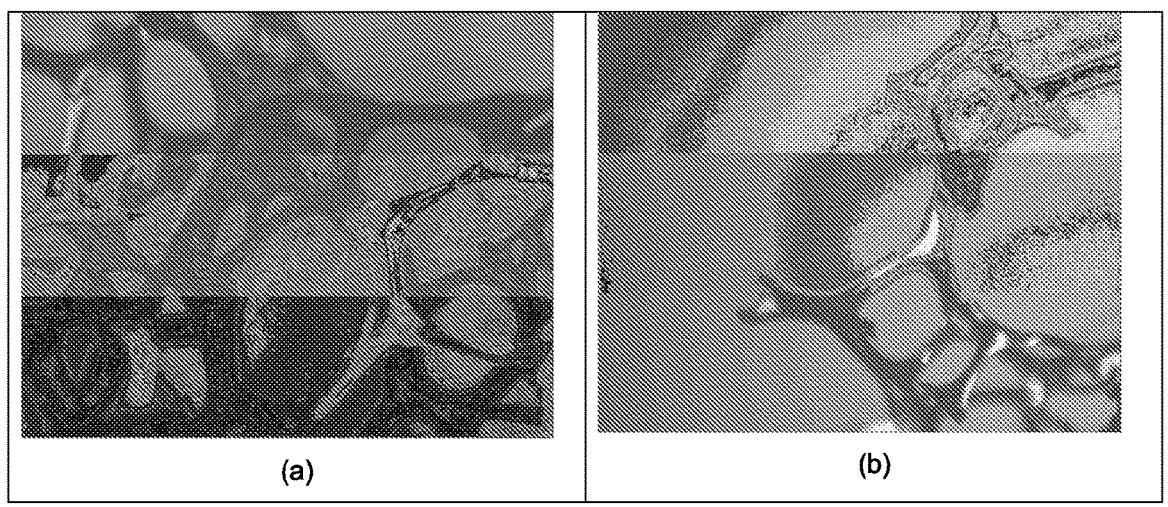
FIG. 2 shows two pictures of an open-cell structured foam at two different spots.

A similar procedure as described in Example 1 was followed, with the difference that the humins fraction was maintained at a temperature of 450° C. The foam obtained is shown in FIG. 2. The Figure shows an open-cell structure. The density of the structure obtained was below 0.1 g/cm$^3$. The foam appeared very brittle.

Example 3

Humins-based foams were prepared in accordance with the procedure of Example 1. The foams were formed into the shape of plant growth substrate mats. Peppers and tomatoes were grown on these mats.

Figure 3:
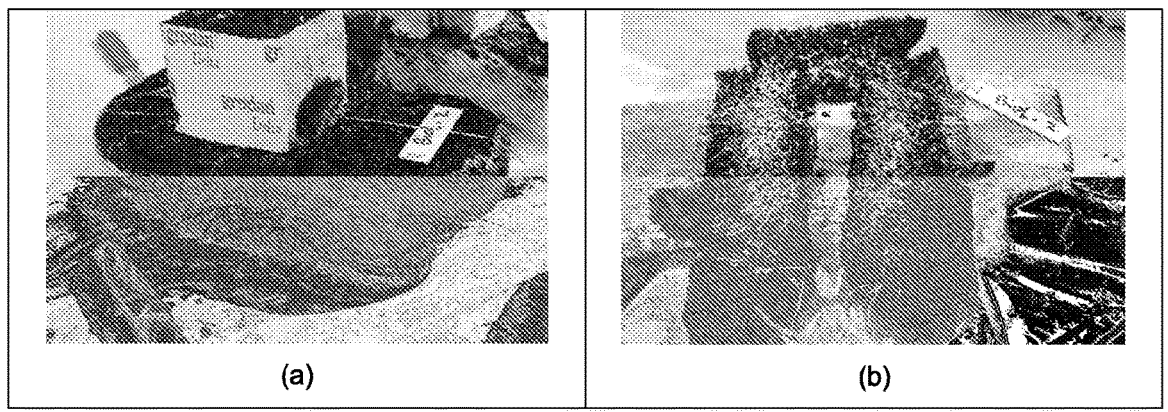
FIG. 3 shows humins-containing foam for use as substrate for plant growth.

The foams showed good properties for use as growing mat; the mats had good water adsorbing properties whilst the plant roots could easily penetrate the foam material. Pictures of parts of the mats are shown in FIG. 3, wherein FIG. 3(a) shows the top side and FIG. 3(b) shows the bottom side of part of the growing mat.

The invention claimed is:

1. A foam comprising a cellular structure and having a density of at most 0.50 g/cm$^3$, wherein the cellular structure is provided by a solid material that comprises humins and a fibrous material.

2. The foam according to claim 1, which has a density in the range of 0.025 to 0.50 g/cm$^3$.

3. The foam according to claim 1, wherein the cellular structure comprises cells with an average cell diameter in the range of 1 to 5,000 μm.

4. The foam according to claim 1, wherein the foam has a specific surface area, as determined according to the BET method, of 1 to 50 m$^2$/g.

5. The foam according to claim 1, wherein the fibrous material has been selected from the group consisting of glass fibers, graphite fibers, aluminum fibers, organic fibers and combinations thereof.

6. The foam according to claim 5, wherein the organic fibers are selected from the group consisting of polyamide fibers, polyolefin fibers, polyvinyl chloride fibers, polyester fibers and combinations thereof.

7. The foam according to claim 6, wherein the weight ratio between humins and fibrous material is in the range of 0.1:1 to 10:1.

8. The foam according to claim 1, wherein the solid material that provides the cellular structure comprises spent mushroom substrate, starch, hemp, nettles, hay, straw, manure, chicken feathers, chitinous materials and combinations thereof.

9. A process for the preparation of a foam comprising a cellular structure and having a density of at most 0.50 g/cm$^3$, wherein the cellular structure is provided by a solid material that comprises humins and a fibrous material, which process comprises:
providing a starting material containing humins and a fibrous material; and
heating the starting material to a temperature in the range of 150 to 450° C.

10. The process according to claim 9, wherein the starting material is heated to a temperature in the range of from 180 to 350° C.

11. The process according to claim 9, wherein the starting material is heated at a pressure of at most 1.5 bar.

12. The process according to claim 9, wherein the starting material is heated for a period ranging from 0.01 to 5 hrs.

13. The process according to claim 9, wherein the starting material comprises humins that have been obtained in the dehydration of carbohydrates, in particular in the dehydration of carbohydrates in the manufacture of levulinic acid, 5-hydroxymethylfurfural (HMF) and ethers or esters of HMF.

14. The process according to claim 9, wherein the starting material containing humins is mixed with a blowing agent before being heated.

15. The process according to claim 14, wherein the blowing agent is selected from the group consisting of water, 5-hydroxymethyl furfural (HMF), $C_1$-$C_4$ alkyl ethers of HMF, $C_1$-$C_4$-alkyl esters of HMF, $C_1$-$C_4$-alkyl esters of levulinic acid, levulinic acid and combinations thereof.

16. The process according to claim 14, wherein the starting material is mixed with the blowing agent in an amount of 0.1 to 10 parts by weight of blowing agent per part by weight of starting material.

17. The process according to claim 9, wherein the starting material is mixed with a monomer containing at least one reactive group towards a hydroxyl, carbonyl or carboxyl group.

18. The process according to claim 17, wherein the reactive group is an epoxy group, an isocyanate group, an amine group, a hydroxyl group or a combination of one or more of such groups.

19. The process according to claim 17, wherein the monomer containing at least one reactive group is mixed with the starting material in an amount of 0.1 to 5% wt, based on the starting material.

20. An article comprising a foam according to claim 1 for use as substrate for plant growth, as adsorbent for treating waste water or waste gases, as support for solid catalysts, as insulation material, or as packaging material.

21. An article comprising a foam obtained in a process according to claim 9 for use as substrate for plant growth, as adsorbent for treating waste water or waste gases, as support for solid catalysts, as insulation material, or as packaging material.

* * * * *